Nov. 19, 1935.    K. E. STUART    2,021,615
LIQUID LEVEL INDICATOR
Filed April 6, 1934    2 Sheets-Sheet 1

INVENTOR.

Kenneth E Stuart

Nov. 19, 1935.  K. E. STUART  2,021,615
LIQUID LEVEL INDICATOR
Filed April 6, 1934   2 Sheets-Sheet 2

INVENTOR.
Kenneth E. Stuart

Patented Nov. 19, 1935

2,021,615

UNITED STATES PATENT OFFICE 2,021,615

LIQUID LEVEL INDICATOR

Kenneth E. Stuart, Merion, Pa., assignor to Hooker Electrochemical Company, New York, N. Y., a corporation of New York Application April 6, 1934, Serial No. 719,346

2 Claims. (Cl. 73—82)

My invention relates to means for indicating liquid levels in closed pressure tanks and more particularly tanks containing volatile liquids of a corrosive or noxious nature, such as liquid chlorine.

In the manufacture and liquefaction of chlorine, also in the plants of large consumers of chlorine, it is necessary or desirable to provide chlorine storage containers. These containers may hold as much as thirty tons of chlorine, with the liquid standing at about two-thirds of the height, the remaining space being, of course, filled with chlorine in gas phase. Owing to the hazard involved in case of a leak permitting such a quantity of chlorine to suddenly escape, it is considered inadvisable to provide connections below the liquid level through which the usual sight glass could be connected. Hence such storage tanks have heretofore been without any means for indicating the level of the liquid contents. When drawing off chlorine the liquid boils more or less and the cooling effect produced is often sufficient to indicate the liquid level by a frost line on the outside of the tank. However, this is not the case if the tank is covered with heat insulation; moreover, when the chlorine is not drawn upon regularly the frost line disappears.

In plants of the character referred to, the quantity of chlorine on hand has therefore at times been somewhat uncertain and the possibility of a shortage has occasionally been an awkward operating factor. The object of my invention is to remedy this state of affairs by providing a simple, dependable liquid level indicator meeting all the conditions of service and introducing no new hazards in the industries having to do with chlorine.

Referring to the drawings.

Figure 1:
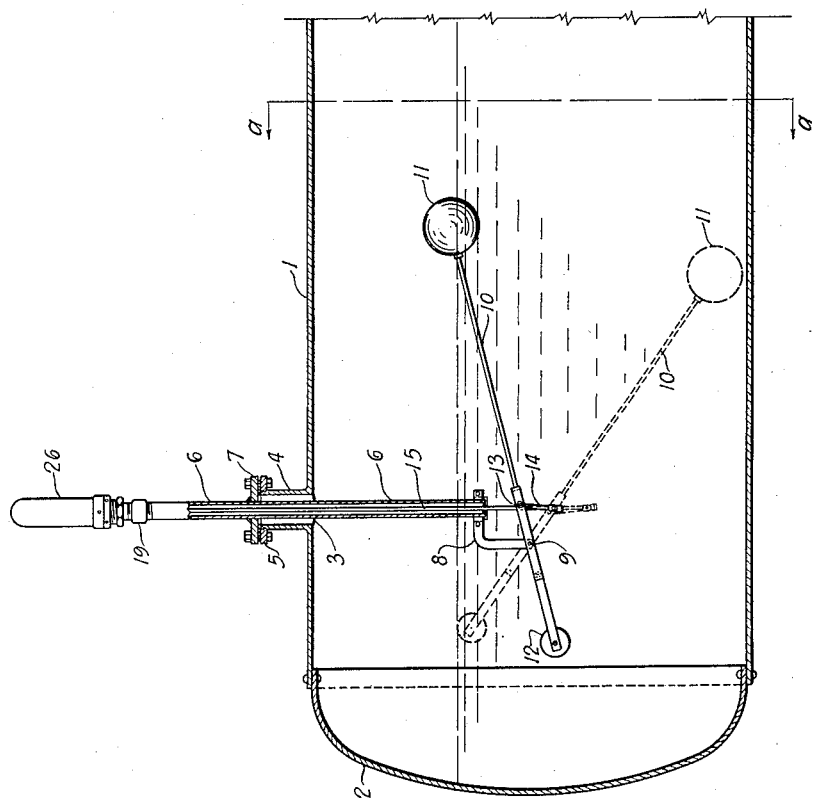
Fig. 1 is a sectional elevation of portion of a chlorine storage tank equipped with my invention.
Figure 2:
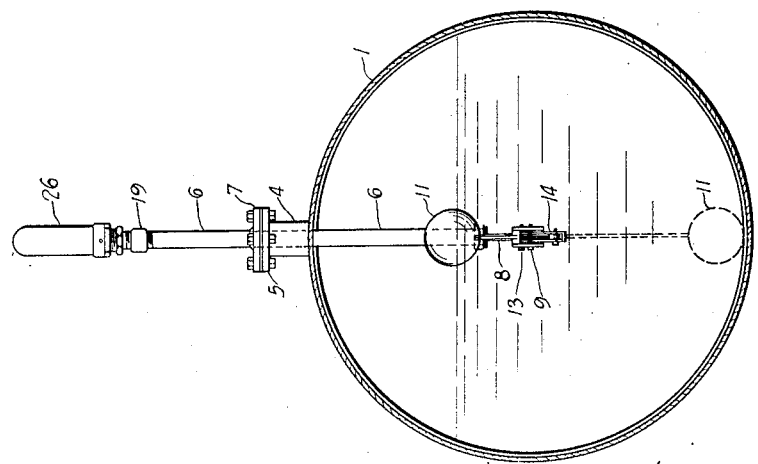
Fig. 2 is a cross-sectional elevation of the same along line a—a of Fig. 1.
Figure 3:
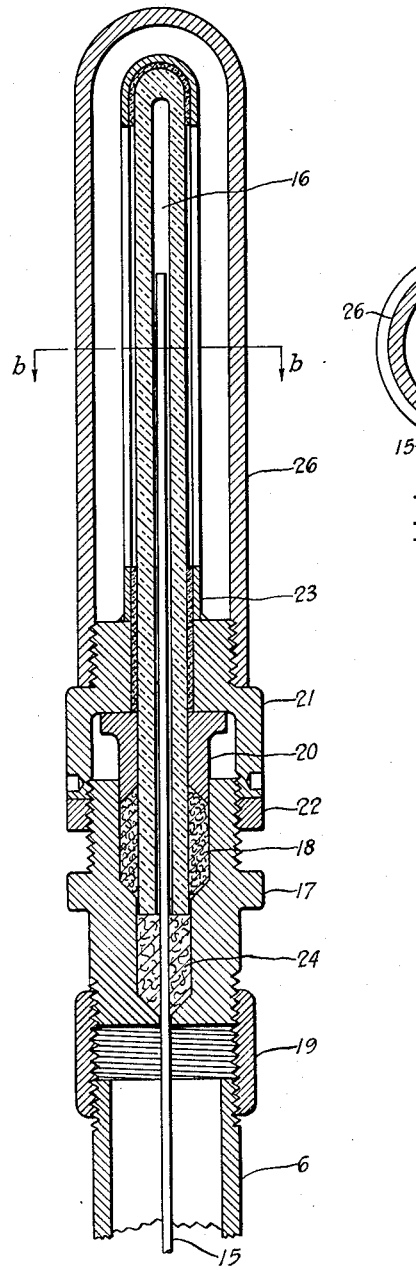
Fig. 3 is an enlarged detail, in section, of the sight glass and indicator rod.
Figure 5:
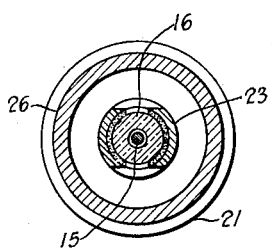
Fig. 5 is a cross section through the line b—b of Fig. 4.

In the figures, 1 is the shell of the storage tank which is of circular section, placed horizontally and provided with the usual dished end 2. 3 is an opening in the top of shell 1 which may be provided with pipe connection 4, flanged at 5. 6 is a pipe inserted through opening 3 and flanged at 7 by means of which flange a pressure tight joint with flange 5 is made. Pipe 6 extends about half way into tank 1 and its lower end is provided with yoke 8 to which lever 10 is pivoted at point 9. At one end, lever 10 carries float 11 and at the other end counterbalance weight 12. At point 13, beneath the lower end of pipe 6, the link 14 is pivoted to lever 10. The lower end of link 14 supports indicator rod 15. The upper end of rod 15 projects into sight glass 16. Sight glass 16 consists of a heavy walled tube, preferably closed at its top end, and inserted through stuffing box 17. Stuffing box 17 which is provided with packing chamber 18, screws into coupling 19 upon the upper end of pipe 6. The stuffing box gland 20 is pressed down to compress the packing of the stuffing box by the member 21, which screws over stuffing box 17 and is locked by nut 22. The member 21 carries welded to it at its upper side the tubular guard 23 in which sight glass 16 is encased. The space between sight glass 16 and guard 23 is filled with plastic material, so that the sight glass is reenforced against bursting by guard 23. The guard 23 is slotted at opposite sides to permit vision through the sight glass. The upper end of indicator rod 15 may therefore be seen through the sight glass.

The float 11 is heavy walled to resist collapsing pressure, and as this would render it too heavy to perform its function properly, the counter-weight 12 is applied in order to give the float the necessary buoyancy.

The distance between points 9 and 13 bears such a relation to the distance from point 9 to float 11 and travel of float 11, that the entire travel of indicator rod may be seen through sight glass 16.

In the lower part of stuffing box 17 is formed a chamber 24, of a diameter sufficient to provide clearance for sight glass 16 and of a length corresponding to that of the chamber 18, so that as gland 20 is pressed down by nut 21, guard 23 may force sight glass 16 down with it into chamber 24. Indicator rod 15 enters chamber 24 through a clearance hole, i. e., a hole of such diameter that the clearance is just sufficient to permit rod 15 to slide freely through it. If the entire sight glass should be broken off, together with its guard 23, the leakage around indicator rod 15 would therefore be only that which could find its way through a minor clearance. If preferred, chamber 24 may likewise be provided with packing to form a stuffing box around indicator rod 15, sight glass 16 in this case serving as a gland. If packing is used in chamber 24 it should be less tightly packed than that in stuffing chamber 18, so that leak-proof pressure may be applied to sight glass 16 without creating too much friction upon indicator rod 15.

As a further precaution in case the sight glass 16 should crack or be knocked off, a cap 26 is provided which may be screwed down upon nut 21 in such a way as to completely enclose the sight glass and guard.

The moving parts of this device should be of some metal that is resistant to chlorine. Steel is sufficiently resistant to dry chlorine for the heavier parts, but part 13 should be of an alloy of copper and nickel and indicator rod 15 of a similar alloy, or silver, so that no binding can take place at opening 25 through even slight corrosion.

Figure 4:
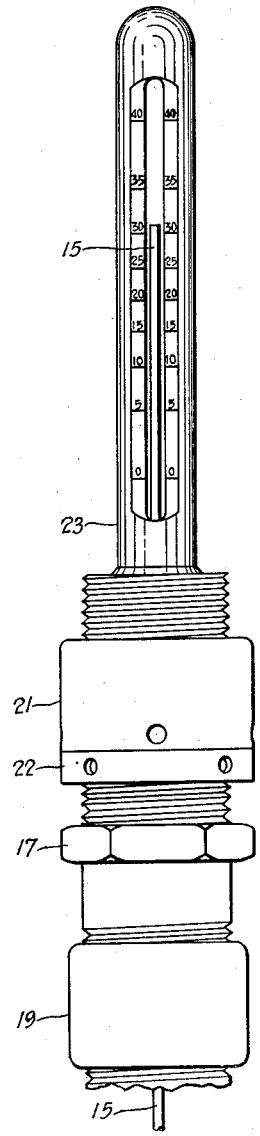
Fig. 4 is an enlarged view showing the indicator scale.

Although a pressure storage tank may obviously be placed on end, it is more usual to place large tanks as indicated on the drawings. When thus placed the cross-sectional area is not proportional to increments of height, and the relationship is further complicated by the dished head. The scale to show equal increments of volume will therefore be irregular and quite special, the graduations being closer near the middle of the scale and further apart at its two extremities. Such a scale is illustrated in Fig. 4 and may be calculated for a given storage tank or determined experimentally by forcing into the tank equal increments of liquid, say one ton of chlorine, and marking the position of the indicator rod upon the scale.

Although I have described my invention as applied to a storage container for chlorine, I do not wish to be limited thereto, as my liquid level indicator is obviously applicable to any pressure tank and especially useful with all corrosive, noxious or toxic liquids.

What I claim is:

1. A device for indicating liquid levels in pressure-tight containers comprising a float adapted to be supported by the liquid, an indicator rod supported by said float and projecting outwardly of said container through a stuffing-box into a tubular, pressure-tight sight glass, packing in said stuffing box bearing against said rod, the inner end of said sight glass bearing against said packing, a slotted guard member enclosing said sight glass and bearing against the outer end thereof and means for bringing sealing pressure against said rod through said packing, said sight glass and said guard member.

2. A device for indicating liquid levels in pressure-tight containers comprising a float adapted to be supported by the liquid, an indicator rod supported by said float and projecting outwardly through an inner stuffing box into a tubular pressure-tight sight glass, packing in said stuffing box bearing against said rod, the inner end of said sight glass bearing against said packing, an outer stuffing box surrounding the inner portion of said sight glass, packing in said outer stuffing box bearing against said sight glass, the packing in said outer stuffing box being more densely compressed than the packing in said inner stuffing box, a slotted guard member enclosing said sight glass and bearing against the outer end thereof and means for bringing relatively light sealing pressure against said rod through the packing in said inner stuffing box, said sight glass and said guard member and for simultaneously bringing relatively heavy sealing pressure against said sight glass through the packing in said outer stuffing box and said guard member.

KENNETH E. STUART.